United States Patent
Ronen et al.

(10) Patent No.: US 12,099,214 B2
(45) Date of Patent: Sep. 24, 2024

(54) NEAR-EYE DISPLAYS WITH SCENERY REFLECTION SUPPRESSION

(71) Applicant: LUMUS LTD., Ness Ziona (IL)

(72) Inventors: Eitan Ronen, Rechovot (IL); Yochay Danziger, Kfar Vradim (IL); Jonathan Gelberg, Modiin (IL); Tsion Eisenfeld, Ashkelon (IL); Amir Shapira, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 753 days.

(21) Appl. No.: 17/268,967

(22) PCT Filed: Aug. 26, 2019

(86) PCT No.: PCT/IB2019/057149
§ 371 (c)(1),
(2) Date: Feb. 17, 2021

(87) PCT Pub. No.: WO2020/044198
PCT Pub. Date: Mar. 5, 2020

(65) Prior Publication Data
US 2021/0271006 A1   Sep. 2, 2021

Related U.S. Application Data

(60) Provisional application No. 62/843,610, filed on May 6, 2019, provisional application No. 62/722,903, filed on Aug. 26, 2018.

(51) Int. Cl.
*G02B 5/00* (2006.01)
*F21V 8/00* (2006.01)
*G02B 27/01* (2006.01)

(52) U.S. Cl.
CPC .......... *G02B 5/003* (2013.01); *G02B 6/0035* (2013.01); *G02B 27/0172* (2013.01); *G02B 6/005* (2013.01); *G02B 2027/012* (2013.01)

(58) Field of Classification Search
CPC .... G02B 6/0035; G02B 6/005; G02B 6/0011; G02B 6/0043; G02B 6/27; G02B 27/0172;
(Continued)

(56) References Cited

U.S. PATENT DOCUMENTS

| | | |
|---|---|---|
| 4,720,189 A | 1/1988 | Heynen et al. |
| 5,208,800 A | 5/1993 | Sobe et al. |

(Continued)

FOREIGN PATENT DOCUMENTS

| | | |
|---|---|---|
| CN | 103837988 | 6/2014 |
| CN | 104536138 A | 4/2015 |

(Continued)

OTHER PUBLICATIONS

International Commission On Non-Ionizing Radiation Protection "ICNIRP Guidelines for Limiting Exposure To Time-Varying Electric, Magnetic and Electromagnetic Fields (Up To 300 Ghz)" Published In: Health Physics 74 (4):494-522; 1998.
(Continued)

*Primary Examiner* — Stephone B Allen
*Assistant Examiner* — Jyotsna V Dabbi
(74) *Attorney, Agent, or Firm* — Rivka Friedman

(57) ABSTRACT

A near-eye display includes a light-guide optical element (LOE) (10) having first and second major external surfaces (11A, 11B) that are planar and mutually parallel. An image projector (2) introduces into the LOE illumination corresponding to an image so that the illumination propagates within said LOE by internal reflection at the major external surfaces. A coupling-out arrangement couples the illumination out of the LOE towards the eye of the observer. The coupling-out arrangement may be a set of mutually-parallel, partially-reflective surfaces (12A) deployed at an oblique angle within the LOE. Various arrangements for suppressing
(Continued)

reflections of ambient light sources include obstructing baffles oriented so as to avoid reduction of peripheral field of view, various non-reflective coatings and various deployments of polarization filters.

6 Claims, 15 Drawing Sheets

(58) Field of Classification Search
CPC ............ G02B 27/01; G02B 27/0101; G02B 27/0176; G02B 27/0018; G02B 27/145; G02B 2027/012; G02B 1/14; H04J 14/06; F21V 8/00
USPC .................................................. 359/614
See application file for complete search history.

(56) References Cited

U.S. PATENT DOCUMENTS

| | | | |
|---|---|---|---|
| 5,235,589 A | 8/1993 | Yokomori et al. | |
| 5,430,505 A | 7/1995 | Katz | |
| 5,712,694 A | 1/1998 | Taira et al. | |
| 5,999,836 A | 12/1999 | Nelson | |
| 6,154,321 A | 11/2000 | Melville et al. | |
| 6,231,992 B1 | 5/2001 | Niebauer et al. | |
| 6,239,092 B1 | 5/2001 | Papasso et al. | |
| 6,264,328 B1 | 7/2001 | Williams | |
| 6,404,550 B1 | 6/2002 | Yajima | |
| 6,542,307 B2 | 4/2003 | Gleckman et al. | |
| 6,671,100 B1 | 12/2003 | McRuer et al. | |
| 6,829,095 B2 | 12/2004 | Amitai | |
| 6,927,694 B1 | 9/2005 | Smith et al. | |
| 7,949,252 B1 | 5/2011 | Georgiev | |
| 8,187,481 B1 | 5/2012 | Hobbs | |
| 8,472,119 B1 | 6/2013 | Kelly | |
| 8,479,119 B2 | 7/2013 | Hörentrup et al. | |
| 8,665,178 B1 | 3/2014 | Wang | |
| 8,848,289 B2 | 9/2014 | Amirparviz | |
| 8,873,150 B2 | 10/2014 | Amitai | |
| 8,913,865 B1 | 12/2014 | Bennett | |
| 9,523,852 B1 | 12/2016 | Brown et al. | |
| 9,738,041 B2 | 8/2017 | Tatsugi | |
| 9,798,061 B2 | 10/2017 | Hsiao et al. | |
| 10,078,222 B2 | 9/2018 | Komatsu et al. | |
| 10,222,535 B2 | 3/2019 | Remhof et al. | |
| 10,564,417 B2 | 2/2020 | Danziger | |
| 10,564,430 B2 | 2/2020 | Amitai et al. | |
| 10,983,355 B2 | 4/2021 | Khan | |
| 11,009,737 B1 | 5/2021 | Matsuda et al. | |
| 11,016,302 B2 | 5/2021 | Freeman et al. | |
| 11,378,391 B2 | 7/2022 | Do et al. | |
| 2003/0165017 A1 | 9/2003 | Amitai | |
| 2003/0235768 A1 | 12/2003 | Fincher et al. | |
| 2004/0032660 A1 | 2/2004 | Amital | |
| 2004/0033528 A1 | 2/2004 | Amitai | |
| 2005/0024849 A1 | 2/2005 | Parker et al. | |
| 2005/0073577 A1 | 4/2005 | Sudo | |
| 2005/0078388 A1 | 4/2005 | Amitai | |
| 2005/0083592 A1 | 4/2005 | Amitai | |
| 2005/0180687 A1 | 8/2005 | Amitai | |
| 2005/0225866 A1 | 10/2005 | Ageel | |
| 2006/0146518 A1 | 7/2006 | Dubin | |
| 2006/0153518 A1 | 7/2006 | AGeel et al. | |
| 2006/0221448 A1 | 10/2006 | NiVon et al. | |
| 2007/0052929 A1 | 3/2007 | Allman et al. | |
| 2007/0070859 A1 | 3/2007 | Hirayama | |
| 2007/0091445 A1 | 4/2007 | Amitai | |
| 2007/0097513 A1 | 5/2007 | Amitai | |
| 2007/0155277 A1 | 7/2007 | Amitai | |
| 2007/0165192 A1 | 7/2007 | Prior | |
| 2007/0273611 A1 | 11/2007 | Torch | |
| 2008/0025667 A1 | 1/2008 | Amitai | |
| 2008/0106775 A1 | 5/2008 | Amitai et al. | |
| 2008/0151375 A1 | 6/2008 | Lin | |
| 2008/0151379 A1 | 6/2008 | Amitai | |
| 2008/0186604 A1 | 8/2008 | Amitai | |
| 2008/0198471 A1 | 8/2008 | Amitai | |
| 2008/0278812 A1 | 11/2008 | Amitai | |
| 2008/0285140 A1 | 11/2008 | Amitai | |
| 2008/0316606 A1 | 12/2008 | Inoguchi et al. | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitai | |
| 2009/0153437 A1 | 6/2009 | Aharoni | |
| 2010/0027289 A1 | 2/2010 | Aiki et al. | |
| 2010/0171680 A1 | 7/2010 | Lapidot et al. | |
| 2010/0201953 A1 | 8/2010 | Freeman et al. | |
| 2010/0214635 A1 | 8/2010 | Sasaki et al. | |
| 2010/0290124 A1 | 11/2010 | Tohara | |
| 2011/0050595 A1 | 3/2011 | Lunback et al. | |
| 2011/0096566 A1 | 4/2011 | Tsai et al. | |
| 2011/0109880 A1 | 5/2011 | Nummela | |
| 2011/0242661 A1 | 10/2011 | Simmonds | |
| 2012/0062998 A1 | 3/2012 | Schultz | |
| 2012/0120498 A1 | 5/2012 | Harrison et al. | |
| 2012/0179369 A1 | 7/2012 | Lapidot et al. | |
| 2013/0007704 A1 | 3/2013 | Bohn | |
| 2013/0070344 A1 | 3/2013 | Takeda | |
| 2013/0135749 A1 | 5/2013 | Akutsu et al. | |
| 2013/0163089 A1 | 6/2013 | Bohn | |
| 2013/0187836 A1 | 7/2013 | Cheng | |
| 2013/0208362 A1 | 8/2013 | Bohn et al. | |
| 2013/0229717 A1 | 9/2013 | Amitai | |
| 2013/0242392 A1 | 9/2013 | Amirparviz et al. | |
| 2013/0276960 A1 | 10/2013 | Amitai | |
| 2013/0279017 A1 | 10/2013 | Amitai | |
| 2014/0003762 A1 | 1/2014 | Macnamara | |
| 2014/0016051 A1 | 1/2014 | Kroll | |
| 2014/0104665 A1 | 4/2014 | Popovitch | |
| 2014/0014065 A1 | 5/2014 | Brown et al. | |
| 2014/0118813 A1 | 5/2014 | Amitai et al. | |
| 2014/0118836 A1 | 5/2014 | Amitai et al. | |
| 2014/0118837 A1 | 5/2014 | Amitai et al. | |
| 2014/0126051 A1 | 5/2014 | Amitai et al. | |
| 2014/0126052 A1 | 5/2014 | Amitai et al. | |
| 2014/0126056 A1 | 5/2014 | Amitai et al. | |
| 2014/0126057 A1 | 5/2014 | Amitai et al. | |
| 2014/0126175 A1 | 5/2014 | Amitai et al. | |
| 2014/0019801 A1 | 7/2014 | Lamb et al. | |
| 2015/0019398 A1 | 1/2015 | Noviello | |
| 2015/0138451 A1 | 5/2015 | Amitai | |
| 2015/0182348 A1 | 7/2015 | Siegal et al. | |
| 2015/0198805 A1 | 7/2015 | Mansharof et al. | |
| 2015/0205140 A1 | 7/2015 | Mansharof et al. | |
| 2015/0205141 A1 | 7/2015 | Mansharof et al. | |
| 2015/0207990 A1 | 7/2015 | Ford | |
| 2015/0235473 A1 | 8/2015 | Schowengerdt | |
| 2015/0243091 A1 | 8/2015 | Schowengerdt | |
| 2015/0277127 A1 | 10/2015 | Amitai | |
| 2015/0289762 A1 | 10/2015 | Popovich et al. | |
| 2015/0293360 A1 | 10/2015 | Amitai | |
| 2015/0309316 A1 | 10/2015 | Osterhout et al. | |
| 2015/0331546 A1 | 11/2015 | Craven-Bartle et al. | |
| 2016/0062120 A1 | 3/2016 | GUpta et al. | |
| 2016/0109712 A1 | 4/2016 | Harrison et al. | |
| 2016/0116739 A1 | 4/2016 | TeKolste et al. | |
| 2016/0116743 A1 | 4/2016 | Amitai | |
| 2016/0161740 A1 | 6/2016 | Bar-Zeev et al. | |
| 2016/0170212 A1 | 6/2016 | Amitai | |
| 2016/0170213 A1 | 6/2016 | Amitai | |
| 2016/0170214 A1 | 6/2016 | Amitai | |
| 2016/0187656 A1 | 6/2016 | Amitai | |
| 2016/0189432 A1 | 6/2016 | Bar-Zeev et al. | |
| 2016/0020965 A1 | 7/2016 | Popovich et al. | |
| 2016/0207457 A1 | 7/2016 | Border et al. | |
| 2016/0209648 A1 | 7/2016 | Haddick et al. | |
| 2016/0024731 A1 | 8/2016 | Andreas | |
| 2016/0266387 A1 | 9/2016 | TeKolste | |
| 2016/0313567 A1 | 10/2016 | Kurashige | |
| 2016/0314564 A1 | 10/2016 | Jones | |
| 2016/0341964 A1 | 11/2016 | Amitai | |
| 2016/0349518 A1 | 12/2016 | Amitai et al. | |

(56) References Cited

U.S. PATENT DOCUMENTS

| | | |
|---|---|---|
| 2017/0003504 A1 | 1/2017 | Vallius |
| 2017/0017095 A1 | 1/2017 | Fricker et al. |
| 2017/0045744 A1 | 2/2017 | Amitai |
| 2017/0052376 A1 | 2/2017 | Amitai |
| 2017/0052377 A1 | 2/2017 | Amitai |
| 2017/0122725 A1 | 5/2017 | Yeoh |
| 2017/0235142 A1 | 8/2017 | Wall et al. |
| 2017/0276947 A1 | 9/2017 | Yokoyama |
| 2017/0293141 A1 | 10/2017 | Schowengerdt et al. |
| 2017/0293149 A1* | 10/2017 | Tatsugi ............. G02B 27/0172 |
| 2017/0307787 A1 | 10/2017 | Kawamura |
| 2017/0336636 A1 | 11/2017 | Amitai et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0003862 A1 | 1/2018 | Benitez |
| 2018/0039082 A1 | 2/2018 | Amitai |
| 2018/0067315 A1 | 3/2018 | Amitai et al. |
| 2018/0101087 A1 | 4/2018 | Shinohara |
| 2018/0157057 A1 | 6/2018 | Gelberg et al. |
| 2018/0203240 A1* | 7/2018 | Jones ................ G02B 27/0179 |
| 2018/0210202 A1 | 7/2018 | Danziger |
| 2018/0023177 A1 | 8/2018 | Schuck et al. |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0284447 A1 | 10/2018 | Matsuki et al. |
| 2018/0284448 A1 | 10/2018 | Matsuki et al. |
| 2018/0292592 A1 | 10/2018 | Danziger |
| 2018/0292599 A1 | 10/2018 | Ofir et al. |
| 2018/0333562 A1 | 11/2018 | Cheng et al. |
| 2018/0341223 A1 | 11/2018 | Shestak et al. |
| 2018/0372940 A1 | 12/2018 | Ishii et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0103650 A1 | 4/2020 | Woods |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150332 A1 | 5/2020 | Danziger et al. |
| 2020/0183159 A1 | 6/2020 | Danziger |
| 2020/0183170 A1 | 6/2020 | Amitai et al. |
| 2020/0192089 A1 | 6/2020 | Haddick et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278547 A1 | 9/2020 | Singer |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292818 A1 | 9/2020 | Amitai et al. |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055555 A1 | 2/2021 | Chi et al. |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0165231 A1 | 3/2021 | Gelberg et al. |
| 2021/0099691 A1 | 4/2021 | Danziger |
| 2021/0109351 A1 | 4/2021 | Danziger |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0173480 A1 | 6/2021 | Osterhout |
| 2021/0231951 A1 | 7/2021 | Dominguez et al. |
| 2021/0239898 A1 | 8/2021 | Danziger et al. |
| 2021/0271006 A1 | 9/2021 | Ronen et al. |
| 2021/0271084 A1 | 9/2021 | Tanaka |
| 2022/0350146 A1 | 11/2022 | Hua et al. |

FOREIGN PATENT DOCUMENTS

| | | | |
|---|---|---|---|
| CN | 106054393 A | * 10/2016 | ......... G02B 27/0101 |
| CN | 205787362 U | 12/2016 | |
| JP | H08-070782 | 3/1996 | |
| JP | 1996313843 | 11/1996 | |
| JP | 2010044172 | 2/2010 | |
| JP | 2012-037761 U | 2/2012 | |
| JP | 2012058404 A | 3/2012 | |
| JP | 2017146494 A | 8/2017 | |
| JP | 2018109738 A | 7/2018 | |
| WO | 2006098097 A1 | 9/2006 | |
| WO | 2013049248 A2 | 4/2013 | |
| WO | 2015192117 | 12/2015 | |
| WO | 2016/133886 | 2/2016 | |
| WO | WO2015012280 | 3/2017 | |
| WO | 2018/013307 | 1/2018 | |
| WO | WO-2019087576 A1 * | 5/2019 | ......... G02B 27/0172 |

OTHER PUBLICATIONS

Jan van de Kraats et al. "Directional and nondirectional spectral reflection from the human fovea" journal of biomedical optics 13(2), 024010 (Mar./ Apr. 2008.

Petros L.Stavroulakis et al : "Suppression iof backsacattered diffraction from sub-wavelength 'moth-eye arrays'"; published in Optics Express Jan. 2013.

R.J Wiblein et al ; "Optimized Anti-Reflective structures for $As_2s_3$ Chalcogenide Optical Fibers", published in Optics Express , May 2, 2016 vol 24 No.9.

O.Yang et al;"Antireflection Effects at NanoStructures Materials Interfaces and the Suppression of Thin-Film Intereference";published in Nanotechnology 24 (2013).

Mukawa et al.;A full-color eyewear display using planar waveguides with reflection volume holograms. Journal of The Society for Information Display—J Soc Inf Disp. Mar. 17, 2009. 10.1889/JSID17.3.185-187 Mar. 31, 2009 (Mar. 31, 2009) pp. 285-287.

Office Action for KR Application 10-2019-7036469 Mailed On Mar. 13, 2024.

* cited by examiner

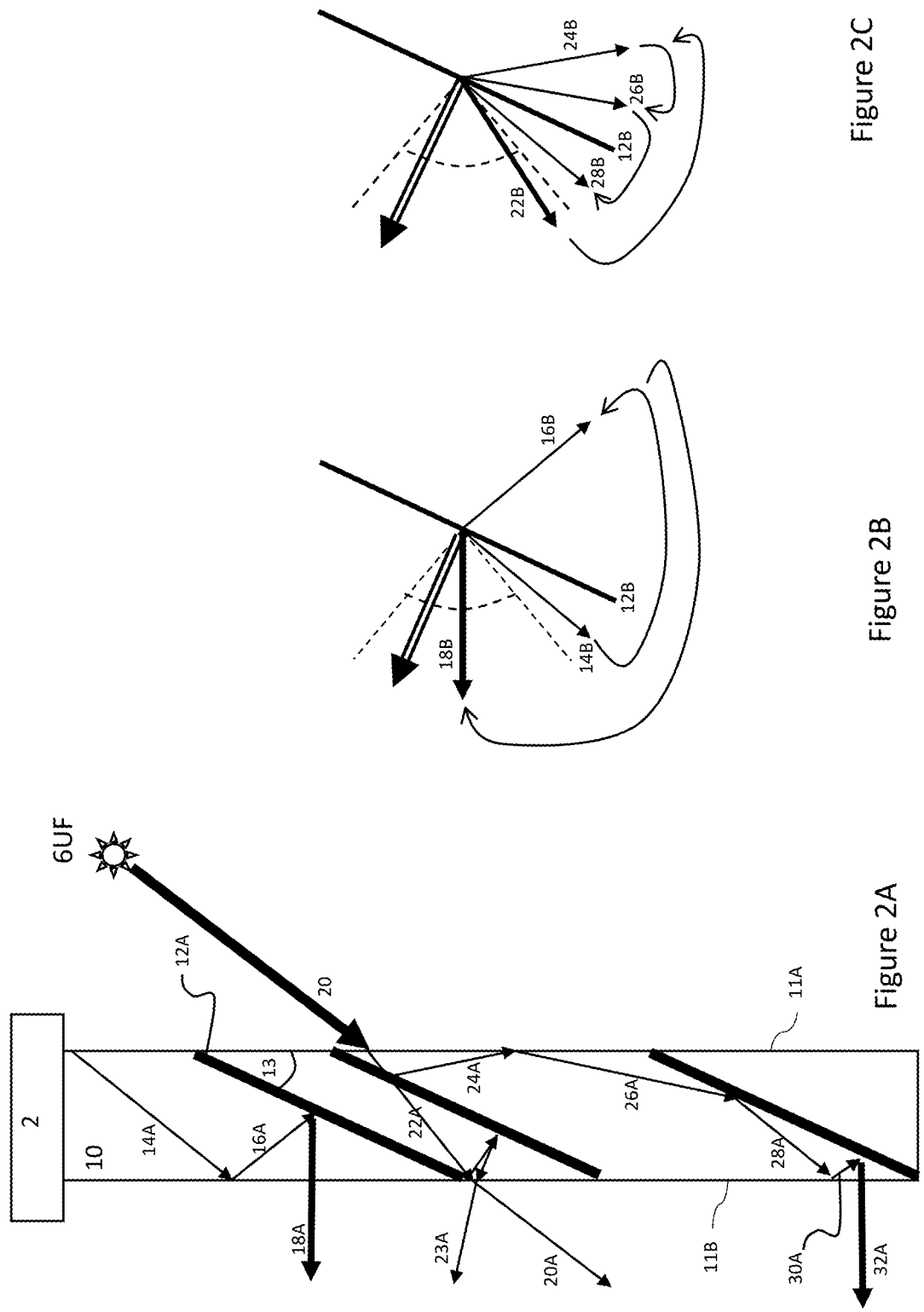

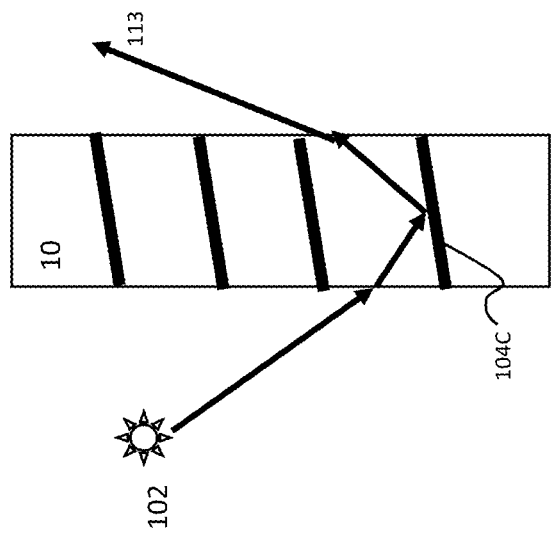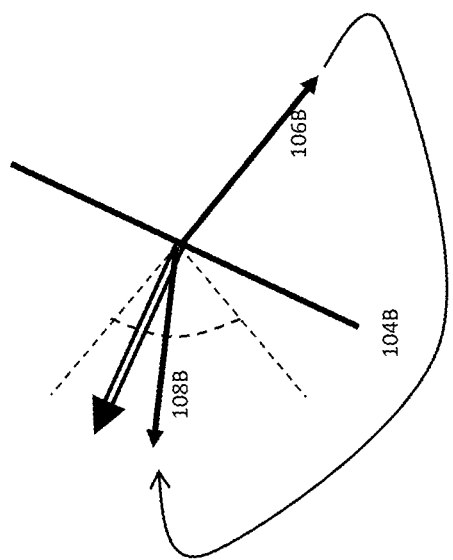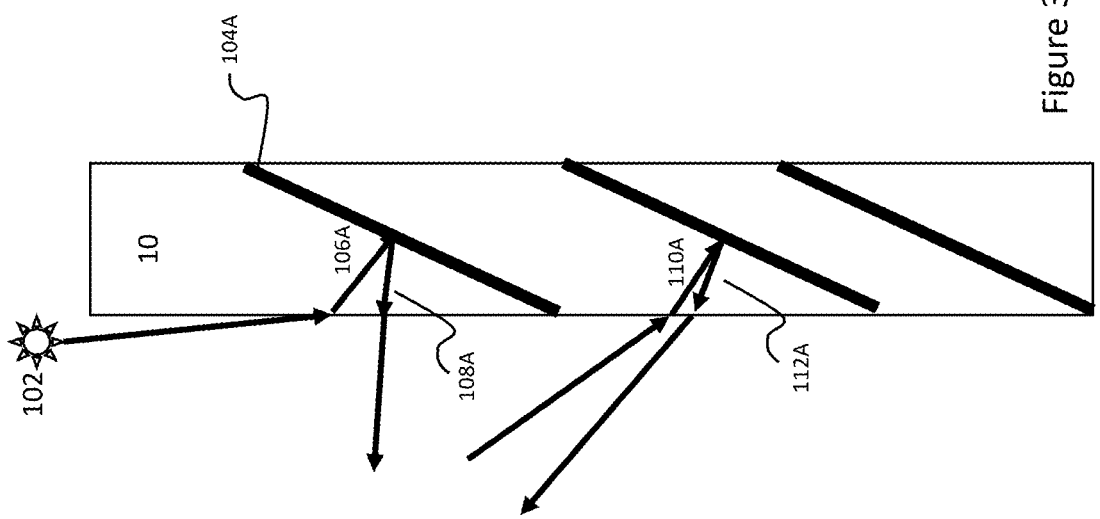

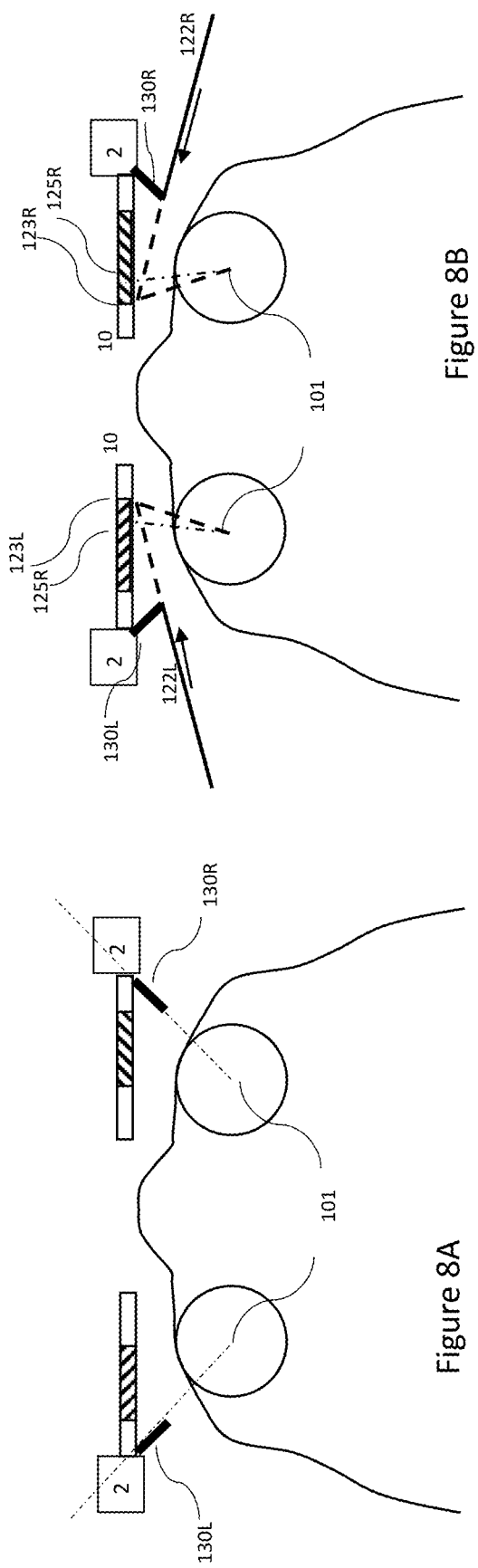
Figure 8A
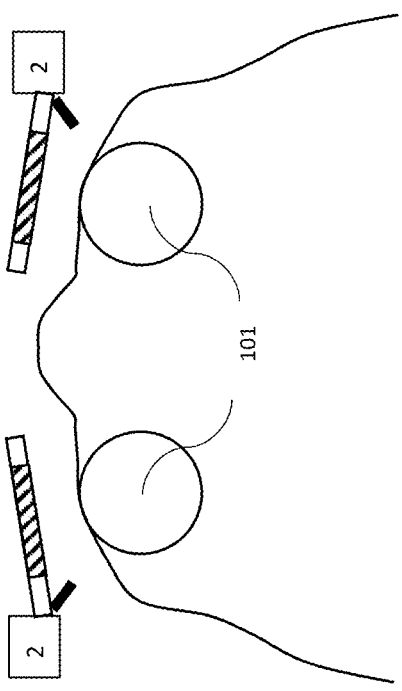
Figure 8B
Figure 8C

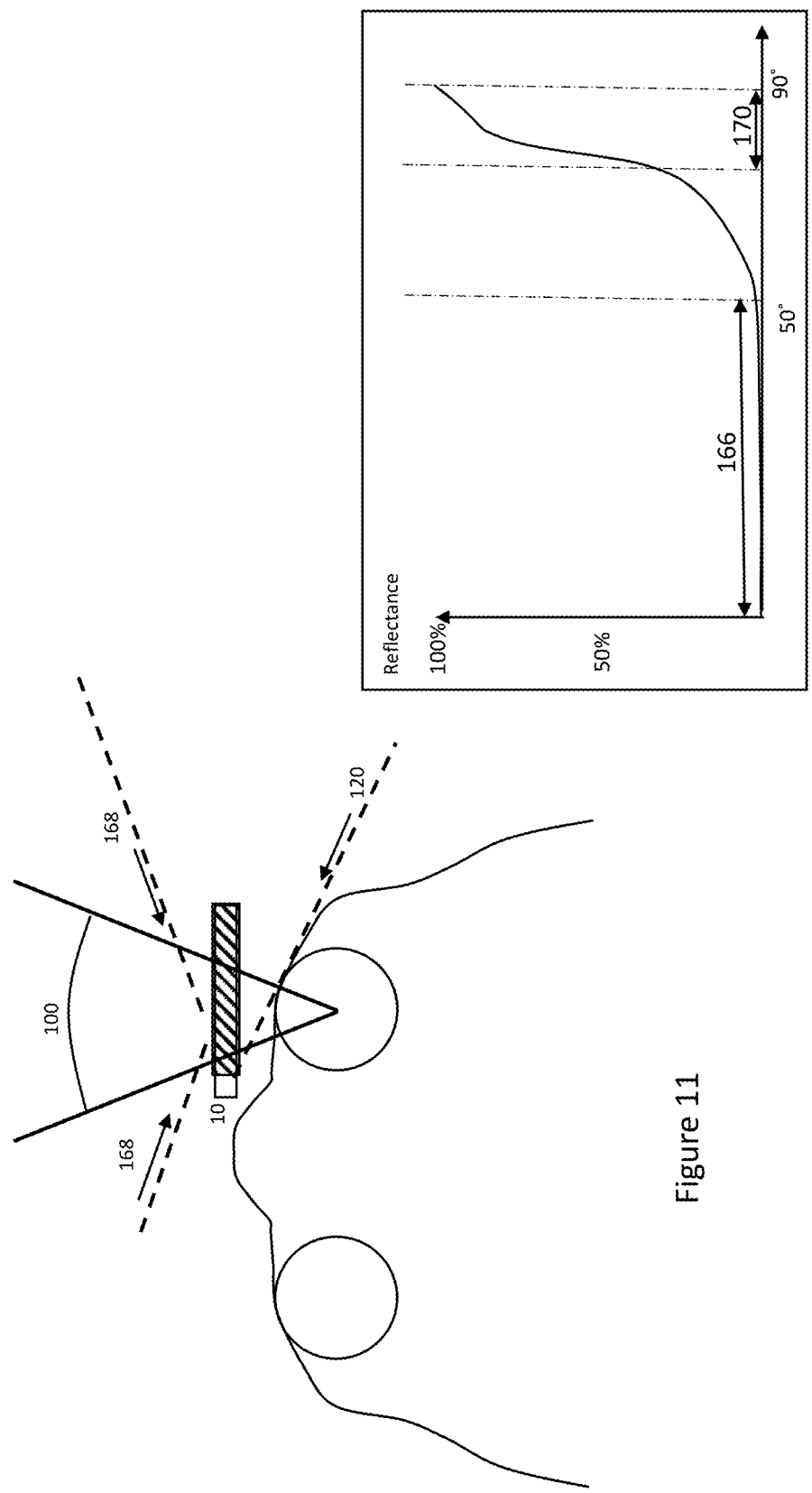

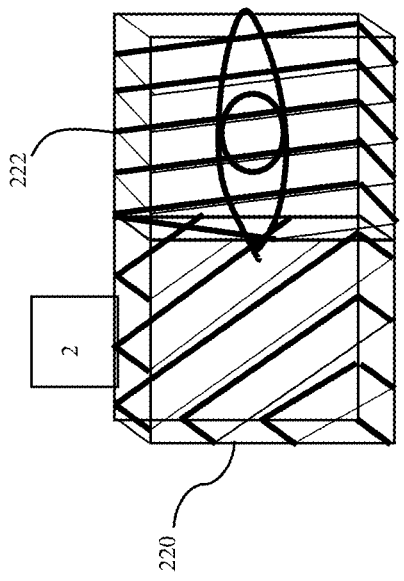
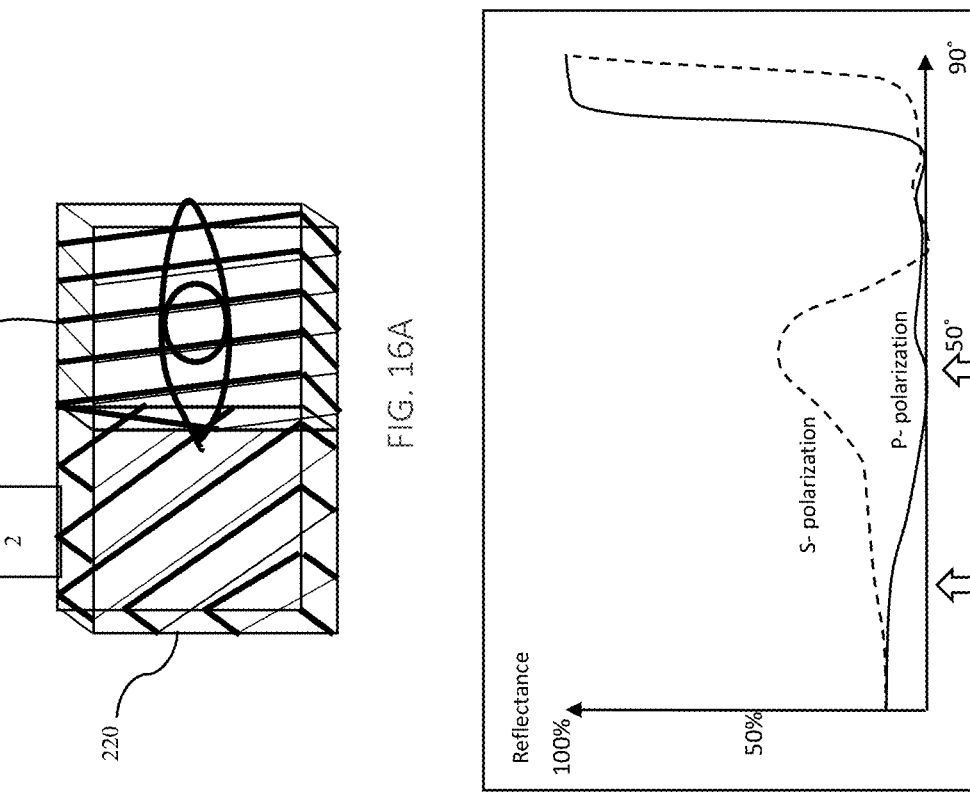

NEAR-EYE DISPLAYS WITH SCENERY REFLECTION SUPPRESSION

FIELD AND BACKGROUND OF THE INVENTION

The present invention relates to near-eye displays and, in particular, it concerns near-eye displays with various features for suppressing ghost images of bright objects.

Many near-eye display systems include a transparent light-guide optical element (LOE) or "waveguide" placed before the eye of the user, which conveys an image within the LOE by internal reflection and then couples out the image by a suitable output coupling mechanism towards the eye of the user. The output coupling mechanism may be based on embedded partial reflectors or "facets", or may employ a diffractive pattern. The description below will refer primarily to a facet-based coupling-out arrangement, but it should be appreciated that various features of the invention are also applicable to diffractive arrangements. Where applied to diffractive elements, the direction of extension of the facets referred to herein can be taken to refer to the direction of elements of the diffraction grating.

The waveguide and facets are at least partially transparent so that light from the surroundings (scenery) can pass through it, allowing the user a direct view of the real world. Some of the scenery light-rays are reflected by the facets and reach the eye at various angles, thereby generating unwanted 'ghost' images (reflections) of the real world.

SUMMARY OF THE INVENTION

The present invention is a near-eye display.

According to the teachings of an embodiment of the present invention there is provided, a near-eye display for projecting an image to an eye of an observer, the near-eye display comprising: (a) a light-guide optical element (LOE) having first and second major external surfaces that are planar and mutually parallel and edges; (b) a support arrangement configured for supporting the LOE relative to the head of the observer with the second major external surface in facing relation to the eye of the observer; (c) an image projector for projecting illumination corresponding to the image, the image projector being optically coupled to the LOE so as to introduce the illumination into the LOE so as to propagate within the LOE by internal reflection at the first and second major external surfaces; (d) a coupling-out arrangement deployed for coupling the illumination out of the LOE towards the eye of the observer; and (e) a light-blocking baffle extending along a majority of one of the edges of the LOE and projecting from a plane of the second major external surface so as to block incident radiation from a range of glancing angles from reaching at least part of the second major external surface, the baffle projecting in a direction towards the eye of the observer forming an acute angle with the second major external surface.

According to a further feature of an embodiment of the present invention, the light-blocking baffle projects in a direction towards a center of an eyeball of the observer.

According to a further feature of an embodiment of the present invention, the coupling-out arrangement comprises a plurality of mutually-parallel, partially-reflective surfaces deployed within the LOE at an oblique angle to the first major external surface.

According to a further feature of an embodiment of the present invention, deployment of the baffle and of the partially-reflective surfaces precludes ray paths from reaching the eye of the observer after entering one of the first and second major external surfaces and undergoing a single reflection from one of the partially-reflective surfaces.

According to a further feature of an embodiment of the present invention, the partially-reflective surfaces have a direction of extension parallel to the second major external surface, and wherein the baffle extends along a majority of one of the edges substantially parallel to the direction of extension of the partially-reflective surfaces.

According to a further feature of an embodiment of the present invention, the light-blocking baffle is mechanically supported by attachment to the LOE.

According to a further feature of an embodiment of the present invention, the light-blocking baffle is mechanically supported by attachment to the support arrangement.

There is also provided according to the teachings of an embodiment of the present invention, a near-eye display for projecting an image to an eye of an observer, the near-eye display comprising: (a) a light-guide optical element (LOE) having first and second major external surfaces that are planar and mutually parallel; (b) a support arrangement configured for supporting the LOE relative to the head of the observer with the second major external surface in facing relation to the eye of the observer; (c) an image projector for projecting illumination corresponding to the image, the image projector being optically coupled to the LOE so as to introduce the illumination into the LOE so as to propagate within the LOE by internal reflection at the first and second major external surfaces; and (d) a coupling-out arrangement deployed for coupling the illumination out of the LOE towards the eye of the observer, wherein the first major external surface is coated with a multi-layer coating configured to provide anti-reflective properties for visible light incident at angles of incidence smaller than 40 degrees and to provide high reflectivity for at least a first polarization of visible light incident at angles of incidence greater than 70 degrees.

According to a further feature of an embodiment of the present invention, the second major external surface is coated with a multi-layer coating configured to provide anti-reflective properties for visible light incident at angles of incidence smaller than 40 degrees and to provide low reflectivity for a second polarization of visible light perpendicular to the first polarization incident at angles of incidence between 70 degrees and 85 degrees.

There is also provided according to the teachings of an embodiment of the present invention, a near-eye display for projecting an image to an eye of an observer, the near-eye display comprising: (a) a light-guide optical element (LOE) having first and second major external surfaces that are planar and mutually parallel; (b) a support arrangement configured for supporting the LOE relative to the head of the observer with the second major external surface in facing relation to the eye of the observer; (c) an image projector for projecting illumination corresponding to the image, the image projector being optically coupled to the LOE so as to introduce the illumination into the LOE so as to propagate within the LOE by internal reflection at the first and second major external surfaces; (d) a coupling-out arrangement deployed for coupling the illumination out of the LOE towards the eye of the observer; and (e) a micro-louver layer associated with the first major external surface of the LOE, the micro-louver layer blocking light incident at an angle of incidence greater than 70 degrees F.rom at least one direction from entering the LOE.

According to a further feature of an embodiment of the present invention, the micro-louver layer includes a one-dimensional array of micro-louvers having an extensional direction, and wherein the micro-louver layer is deployed with the extensional direction substantially horizontal.

According to a further feature of an embodiment of the present invention, the micro-louver layer includes two arrays of micro-louvers having substantially perpendicular extensional directions.

There is also provided according to the teachings of an embodiment of the present invention, a near-eye display for projecting an image to an eye of an observer, the near-eye display comprising: (a) a light-guide optical element (LOE) having first and second major external surfaces that are planar and mutually parallel; (b) a support arrangement configured for supporting the LOE relative to the head of the observer with the second major external surface in facing relation to the eye of the observer; (c) an image projector for projecting illumination corresponding to the image, the image projector being optically coupled to the LOE so as to introduce the illumination into the LOE so as to propagate within the LOE by internal reflection at the first and second major external surfaces; (d) a coupling-out arrangement deployed for coupling the illumination out of the LOE towards the eye of the observer, the LOE and the coupling-out arrangement defining at least one high-incident-angle polarization-dependent optical path incident on one of the first and second major external surfaces at an angle of incidence greater than 60 degrees and exiting the LOE towards the eye of the observer, the polarization-dependent optical path having a favored orientation of polarization; and (e) a polarization filter deployed to prevent external light advancing along the polarization-dependent optical path with the favored orientation of polarization from reaching the eye of the observer.

According to a further feature of an embodiment of the present invention, the polarization filter is deployed to filter light entering the first major external surface.

According to a further feature of an embodiment of the present invention, the polarization filter is deployed to filter light exiting the second major external surface towards the eye of the observer.

According to a further feature of an embodiment of the present invention, the illumination out of the LOE towards the eye of the observer is substantially polarized with an image polarization, and wherein the polarization filter is deployed to block light having a polarization perpendicular to the image polarization.

According to a further feature of an embodiment of the present invention, there is also provided a second polarization filter deployed to filter light entering the first major external surface, the polarization filter and the second polarization filter being aligned so as to transmit the same polarization.

According to a further feature of an embodiment of the present invention, there is also provided a lateral polarizing shade element for filtering light from at least one direction along a path between the observer's eye and the LOE, wherein a polarizing axis of the lateral polarizing shade element is at an angle crossed relative to a polarizing axis of the polarization filter.

According to a further feature of an embodiment of the present invention, there is also provided a lateral polarizing shade element for filtering light from at least one direction along a path between the observer's eye and the LOE.

According to a further feature of an embodiment of the present invention, the coupling-out arrangement comprises a plurality of mutually-parallel, partially-reflective surfaces deployed within the LOE at an oblique angle to the first major external surface.

BRIEF DESCRIPTION OF THE DRAWINGS

The invention is herein described, by way of example only, with reference to the accompanying drawings, wherein:

FIG. 2A is an enlarged schematic side view of the near-eye display of FIG. 1A illustrating light ray paths for image illumination and for exemplary "ghost" light paths from ambient light sources;

FIGS. 2B and 2C are angular diagrams illustrating the angular relationships between various parts of the light ray paths for the image ray path and the ghost ray path of FIG. 2A;

FIG. 3A is an enlarged schematic side view of a light-guide optical element from the near-eye display of FIG. 1A illustrating an alternative set of exemplary "ghost" light paths from ambient light sources on the rear side of the light-guiding optical element;

FIG. 3B is an angular diagram illustrating the angular relationships between various parts of the light ray paths for the ghost ray path of FIG. 3A;

FIG. 3C is an enlarged schematic side view of a variant implementation of the light-guide optical element from the near-eye display of FIG. 1A;

FIGS. 8A and 8B are views similar to FIG. 7 illustrating use of an obstructing baffle according to a further aspect of an embodiment of the present invention to block certain ghost light paths from reaching the observer's eyes, shown with and without exemplary ray paths, respectively;

FIG. 8C is a view similar to FIG. 8A illustrating a variant of a binocular near-eye display according to an aspect of the present invention employing two non-coplanar light-guide optical elements deployed with an angle of between 10-30 degrees between them to better conform to a face curvature, illustrating the impact of this inclination on the baffle geometry;

FIG. 11 is a schematic top view of an implementation of the present invention illustrating typical incident angles of rays from ambient light sources compared to the field of regard of the scene directly viewed by the observer;

FIG. 12 is a graph illustrating reflectivity properties of a preferred anti-reflective coating as a function of incident angle for a surface of the light-guide optical element according to an aspect of an embodiment of the present invention;

FIG. 16A is a partial schematic view of a near-eye display based on the light-guide optical element of FIG. 14A;

FIG. 16B is a schematic top view of the near-eye display of FIG. 16A implemented as binocular display with a non-uniform polarizing filter; and FIG. 16C is a graph illustrating reflectance as a function of angle of incidence for the partially-reflective surfaces of the light-guide optical element in the implementation of FIGS. 16A and 16B.

DESCRIPTION OF THE PREFERRED EMBODIMENTS

The present invention is a near-eye display.

The principles and operation of near-eye displays according to the present invention may be better understood with reference to the drawings and the accompanying description.

Introduction and Classification of "Ghost Images"

In order to fully understand the various aspects of the present invention, it is important to identify various different directions from which incident light reaching the light-guide optical element (LOE) may generate "ghosts" that are potentially troubling to the eye of the observer.

Figure 1B:
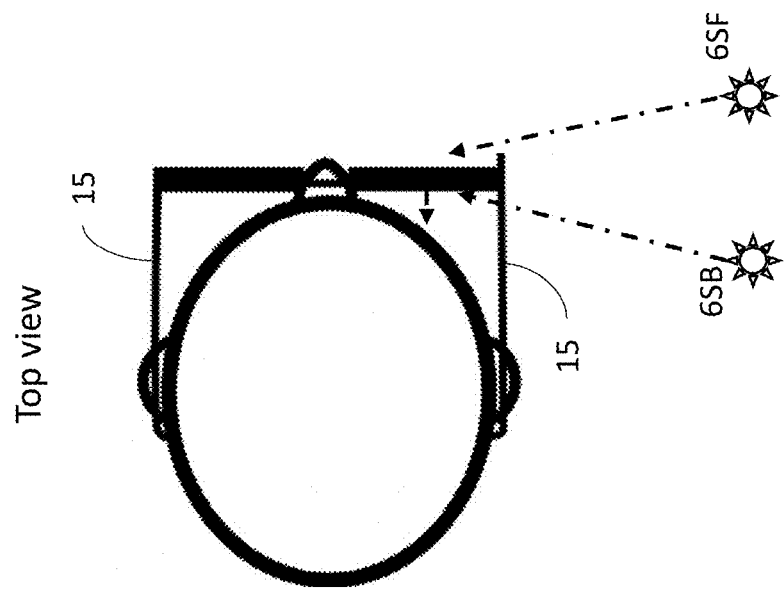
FIGS. 1A and 1B are schematic side and top views of an observer using a near-eye display constructed and operative according to the teachings of the present invention, illustrating various ambient light sources which may give rise to reflections to be suppressed.
Figure 1A:
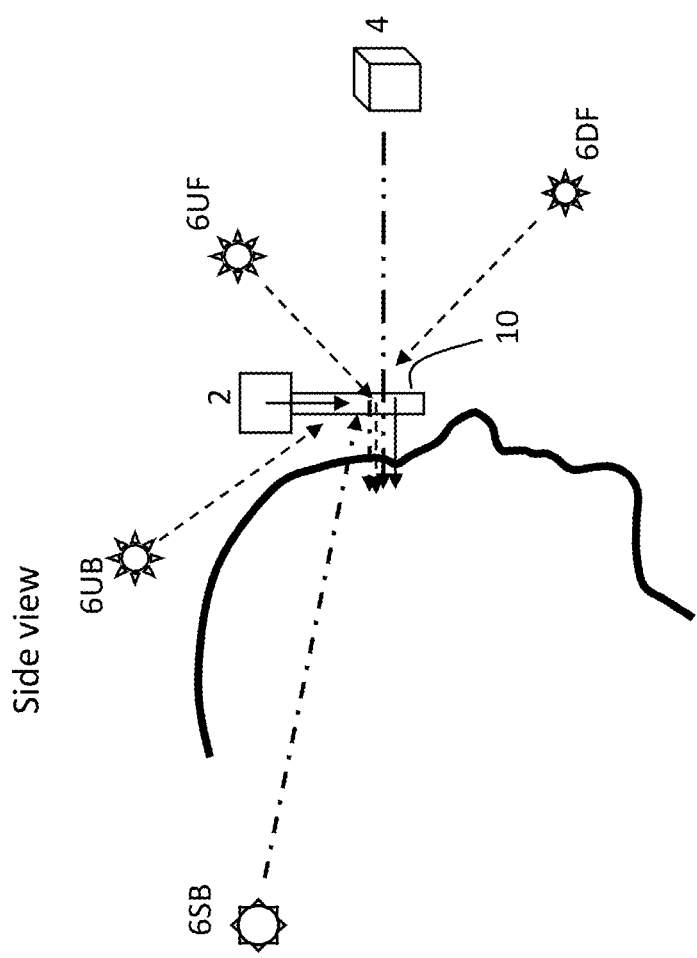

By way of introduction, FIG. 1A shows schematically an observer looking through a near-eye display. In general terms, the near-eye display includes a light-guide optical element (LOE) or "waveguide" 10 having first and second major external surfaces 11A and 11B that are planar and mutually parallel, and having edges that are typically not optically active. An image projector 2 is optically coupled to LOE 10 so as to introduce in the LOE illumination corresponding to an image so that the illumination propagates within said LOE by internal reflection at major external surfaces 11A and 11B. Optical coupling of image projector 2 to LOE 10 may be achieved via a coupling prism with an obliquely angled input surface, or via a reflective coupling arrangement, via a side edge and/or one of the major external surface of the LOE.

Examples of suitable image projectors (or "PODs"), for example, employing an illumination source, a spatial light modulator such as an LCOS chip, and collimating optics, typically all arranged on surfaces of one or more PBS cube or other prism arrangement, are well known in the art. Similarly, suitable coupling-in configurations for coupling the image into the LOE, such as by use of a coupling-in reflector or by a suitably angled coupling prism, are well known in the art. Coupling between the image projector and the LOE may be direct, or may be via an additional aperture expanding arrangement for expanding the dimension of the aperture across which the image is injected in the plane of the LOE. For conciseness of presentation, neither the projector nor the coupling-in configuration will be discussed further herein, and their combination is represented here only schematically.

The near-eye display also includes a coupling-out arrangement deployed for coupling the illumination out of the LOE towards the eye of the observer for viewing by the observer. The coupling-out arrangement is illustrated herein as a plurality of mutually-parallel, partially-reflective surfaces (or "facets") 12A deployed within LOE at an oblique angle to the major external surfaces 11A and 11B. The facets typically have angular-dependent coatings to provide high transmission at certain angles and partial reflection at other angles, as discussed further below. Various implementations of LOE's including such facets are commercially available from LUMUS Ltd. (Israel). Although the description herein refers primarily to facet-based coupling-out arrangements, it will be appreciated by one ordinarily skilled in the art that various of the aspects of the present invention are also applicable to alternative coupling-out arrangements, such as coupling-out arrangements based on diffractive optical elements.

The near-eye displays of the present invention are typically head-mounted displays, and therefore preferably include a support arrangement configured for supporting LOE 10 relative to the head of the observer with second major external surface 11B in facing relation to the eye of the observer. The support arrangement is shown schematically in FIG. 1B as a glasses frame structure including sides 15 for supporting the display relative to the ears of the observer. This is only one of a number of options including also a headband mounted structure and a display associated with a helmet. Details of the support arrangement per se are not critical to the present invention, and will not be described herein in detail.

As illustrated schematically in FIG. 1A, projector 2 injects light corresponding to the desired image (solid arrow) into the waveguide and this light is coupled out of the waveguide towards the observer's eye. Light from objects 4 in the scenery (double-dot-dash line) passes through the waveguide to the observer with some intensity degradation. Various potential directions of incidence of extraneous outside light are labeled with reference numeral 6 plus a two letter code indicating the direction: up, down or side (U, D or S, respectively) and front or back (F or B, respectively). The side directions are illustrated more clearly in the top view of FIG. 1B.

FIG. 2A is an enlarged schematic view showing the projector 2, the waveguide and selected internal facets 12A having an angle 13 relative to the major parallel external faces forming the front and rear of the waveguide. In the exemplary configuration illustrated here, the projector is on top (as in FIG. 1A). The facets are in this case typically horizontally-extending partial reflectors that couple-out the light from the waveguide and towards the observer's eye, although they are not necessarily exactly horizontal. In this example, only one light beam of the image is shown for clarity of presentation, but in practice, an angular spread of an image, typically collimated to infinity, is projected along the waveguide and coupled-out towards the eye. The spacing of the facets is presented as non-uniform in order to facilitate illustration of the paths of reflection, but is typically uniform.

The guided light of the image is represented here by rays 14A and 16A that reflect from the external faces of the waveguide. As ray 16A impinges on one of the facets, part of it reflects as ray 18A toward the observer. FIG. 2B shows the corresponding ray directions in angular space where 12B corresponds to the angle of the plane of the facets 12A and the double arrow represents the vector of this plane (perpendicular to the plane applicable when diffractive element performs the out coupling). Vectors 14B, 16B and 18B represent the directions of rays 14A, 16A and 18A, respectively. The dashed angle in FIGS. 2B and 2C represent the TIR angle of the external face of waveguide 10, i.e., that rays such as 18B which fall within the illustrated angular range will escape from the waveguide, while ray directions outside that range will be internally reflected.

Any architecture of a waveguide and an output coupling mechanism typically has inherently various undesired mechanisms of reflection from the scenery. Ray 20 originates from a source 6UF (a source in front of the user and above the normal field of view of the real world observed via the waveguide, which is a typical scenario of sunlight or overhead lighting) and refracts into the waveguide as ray 22A. This ray is shown in the angular space of FIG. 2C as vector 22B. Most of this light ray will pass through the waveguide and refract out of the waveguide as ray 20A, which is outside the normal field of view and does not disturb the observer. Part of ray 22A, however, may reflect from one of facets 12A (plane 12B) as ray 24A (vector 24B). This ray will be reflected by the external face of the LOE as ray 26A (vector 26B) and is reflected once more by one of facets 12A as ray 28A (vector 28B). The vector 28B is approximately the same as vector 14B, therefore the ray will continue to propagate the same way as 14A (14B) towards the observer's eye. This is presented as rays 30A (equivalent to 16A) and 32A (equivalent to 18A).

Another possible mechanism to generate disturbing ghost illumination is partial reflection of ray 22A from the rear surface 11B of the LOE, followed by partial reflection of that ray from facet 12A, thereby generating an output ray 23A.

FIG. 3A describes in real space the optical path of 'single reflection' from a source 102, in a case of side injection of an image into a light guide, where the extensional direction of the facets is roughly vertical. This source resembles sources 6SB in FIG. 1B. FIG. 3B describe the same process in angular space. The light from the source refracts into the waveguide as ray 106A (vector 106B), is reflected by facet 104A (plane 104B) as ray 112A (vector 112B) and refracts out of the waveguide. This process involves only one reflection by the facet, in contrast to other types of reflection paths that involve multiple facet reflections. Consequently, this single same side reflection may in some cases be a particularly bright reflection. As the scenery source illuminates at an angle further from grazing incidence, the reflection angle becomes larger, as illustrated by comparing rays 110A and 112A with rays 106A and 108A.

Figure 4:
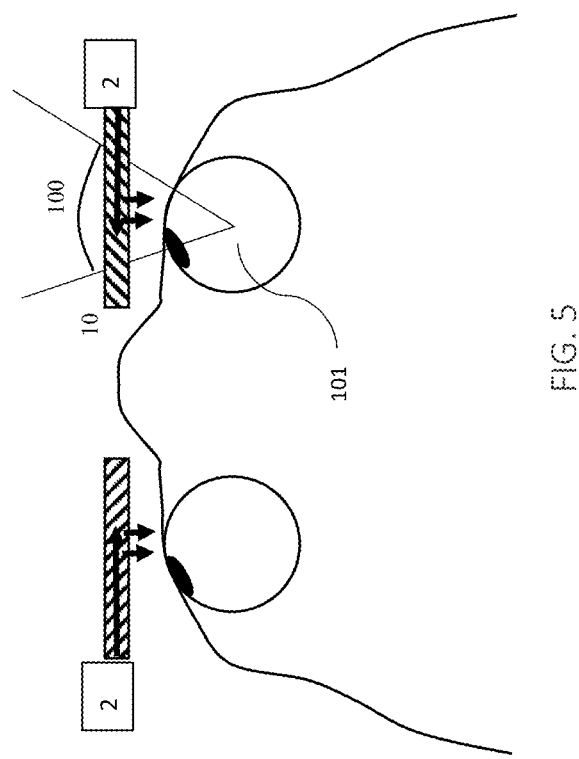
FIGS. 4 and 5 are schematic top views illustrating the range of a field of regard of the observer through the near-eye display of FIG. 1A.
Figure 5:
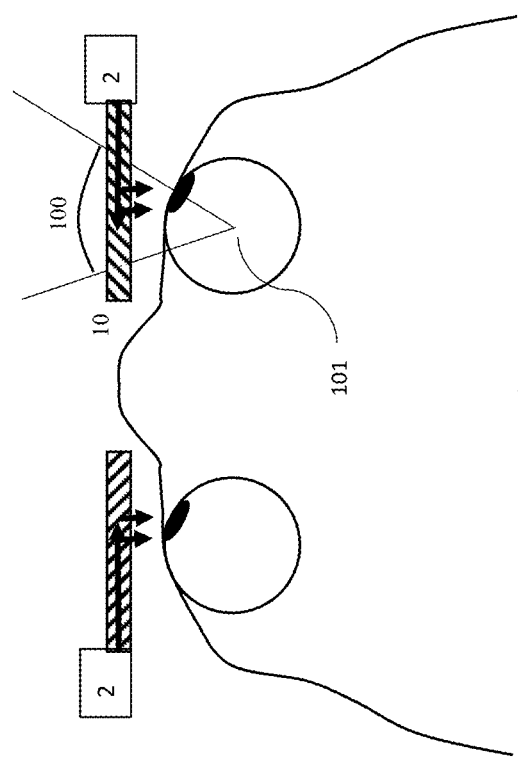

The geometry of the waveguide and its position relative to the eye determines the angular distribution of reflections that will reach the eye. FIGS. 4 and 5 show a top view of an observer's head. The relative positioning of the waveguide and the user's eyes is determined by a support structure, such as a glasses-frame support structure or some other head-mounted support structure, which is omitted here for simplicity of presentation. In this example, the waveguide 10 is configured with the image illuminated introduced from the side, as apparent from solid arrows and facets angle. The facets in this example are referred to as 'vertical facets'.

The pupil can move within a range of positions and orientations, but the central ray from central field crosses the center of the eyeball 101 towards the fovea in all directions of observation as shown in FIGS. 4 and 5. The angular field of interest for the observer is described as angle 100. Equivalent angles exist vertically. For clarity, other considerations for enlarging angle 100 are not include in the description, such as IPD or eye-box tolerances.

Geometrical Blocking of Rear-Side Ghosts

According to a first aspect of an embodiment of the present invention illustrated in FIGS. 8A-8C, the near-eye display is provided with a light-blocking baffle (130L, 130R) extending along a majority of one of the edges of the LOE and projecting from a plane of the second major external surface so as to block incident radiation from a range of glancing angles from reaching at least part of the second major external surface, the baffle projecting in a direction towards the eye of the observer forming an acute angle with the second major external surface, and most preferably projects in a direction towards a center of an eyeball of the observer. This ensures that the baffle has minimal impact on the peripheral field of view of the observer, leaving the observer with an impression of an unrestricted field of view.

The baffle preferably extends along an edge of the LOE that is substantially parallel to the direction of extension of the partially-reflective surfaces parallel to the major surfaces. According to a geometrical definition, the extensional direction of the facets parallel to the major surfaces may be defined as a line of intersection between a plane within which one of the partially-reflective surfaces lies and the plane of the first major external surface. "Substantially parallel" as used herein preferably refers to directions that are parallel or within about 20 degrees of each other.

According to a first option, the light-blocking baffle 130L, 130R is mechanically supported by attachment to the LOE 10. Alternatively, the light-blocking baffle is mechanically supported by attachment to the support arrangement (not shown in these drawings).

Figure 6:
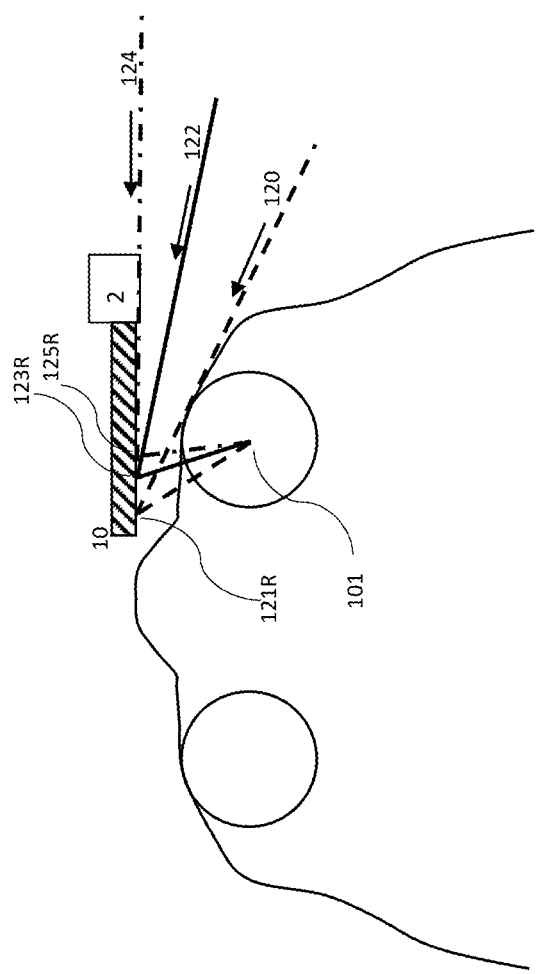
FIG. 6 is a view similar to FIG. 4 illustrating a range of angles at which incident ambient light rays from the rear of the light-guide optical element can reach the observer's eye after a single reflection at an internal facet of the light-guide optical element.

The preferred geometrical considerations for implementing the baffles are as follows. As discussed above, FIGS. 3A-3C present the angular dependence of rays that have undergone a single reflection as a function of the incident angle of illumination on the rear side of the light guide (3A, 3B) or single reflection from front side 3C. FIG. 6 illustrates the implications of this angular dependence in a top view of a near-eye display deployed on an observer's head. The waveguide 10 reflects scenery light ray 120 towards the center of the observer's eyeball 101 from point 121R on the waveguide, ray 122 from point 123R and grazing ray 124 from point 125R.

Figure 7:
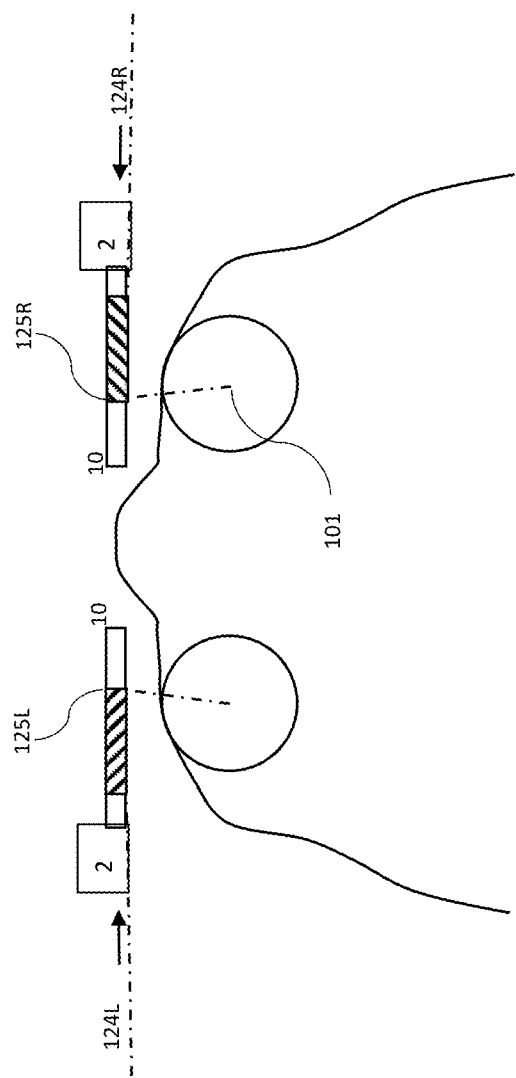
FIG. 7 is a view similar to FIG. 6 illustrating a variant implementation in which an area containing the internal facets is limited in order to suppress certain ghost light paths from reaching the observer's eyes.

According to certain embodiments of an aspect of the present invention, the last facet (i.e., furthest from the image projector) is located where reflection from critical angle ray resulting from a grazing-incidence ray from the scene (124R or L) can no longer reach eye center 101 as shown by 125 in FIG. 7. The facets in the waveguide of the right (or left) eye terminate at the point where the ray 124R (L) reflect onto eye center 101. From FIG. 6, it is apparent that any other ray cannot reflect onto 101 since there are no facets to reflect the light there.

While the above approach may be effective to avoid single-reflection bright ghosts from rear-side ambient illumination in some scenarios, the geometrical limitation on the location of the "last facet" may not provide sufficient angular field of view for some applications. According to a further aspect of the present invention, using the geometrical relationship illustrated in FIG. 6 and after identifying the extent of the angular field of view required (e.g., extending to location 123R as illustrated in FIG. 6), it is possible to identify a limited range of angles (e.g., from ray 124 through the angle of ray 122) which need to be obstructed in order to avoid single-reflection ghosts from the region requiring output facets from reaching the observer's central vision.

The light-obscuring baffle 130L, 130R implemented according to these principles is typically relatively small, extending generally rearward from the periphery of the optical arrangement with greatly reduced obstruction to the observer's peripheral vision compared to a full side-blocking arrangement. In certain particularly preferred implementations, the baffles are implemented so as to extend from the periphery of the optical arrangement generally towards the eye, in some cases aligned with some feature of the projector and/or a frame side, so as to have little-to-no obscuring effect on the observer's peripheral vision.

In FIG. 8A an example of such obscuring baffles is shown. The baffles 130R and 130L are here shown as flat planes located at the edge of the waveguide and oriented toward 101 as shown by the dot-dashed line. For a predefined virtual FOV the length of the waveguide 10 with facets is defined 123R(L). The optical path of the back-reflection is defined and the baffle 130R(L) length is set to block this optical path of the rays reflected by the last facet as shown in FIG. 8B. Tilted waveguides can also use this scattering blocking as shown in FIG. 8C. In addition to conforming aesthetically to the "face curve" of the user, such inclined waveguides further relax the requirements on the dimensions of the baffle by casting a longer "shadow" across the rear surface of the waveguide for a given length of baffle.

Thus, most preferably, the deployment of baffle 130L, 130R and of the partially-reflective surfaces precludes ray paths from reaching the eye of the observer after entering one of the first and second major external surfaces and undergoing a single reflection from one of the partially-reflective surfaces.

Exclusion of High Incident Angle Rays

A further aspect of an embodiment of the present invention, useful both alone and in combination with other aspects described herein, relates to approaches for managing incident rays which approach the first (outer) major external surface 11A of LOE 10 at high angles of incidence.

Referring again to FIG. 2A, it is noted that many of the problematic reflections of real-world light sources begin with high-angle incident rays, such as is illustrated here schematically as ray 20. If such rays can be excluded from entering the LOE at all, this would clearly avoid the incident radiation generating troublesome reflections towards the observer's eye.

Proper coating of external facets of waveguide 10 can thus attenuate scenery reflection as presented in FIGS. 11 and 12. Angle 100 represents the angular field that an observer sees the surroundings through waveguide 10.

Figure 10C:
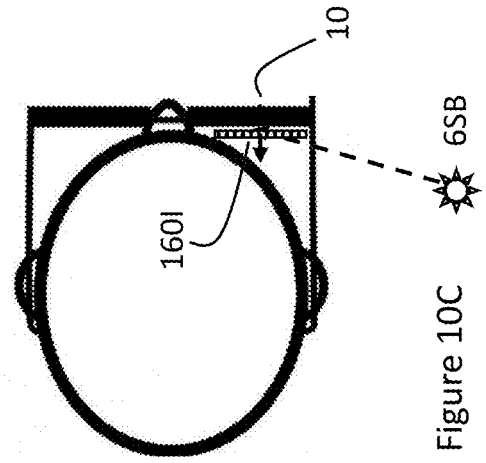
FIGS. 10C and 10D are top views of the implementation of FIG. 10B without and with a lateral polarizing filter, respectively.
Figure 10D:
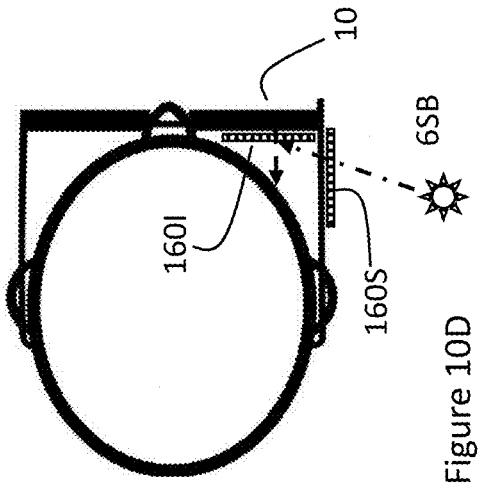

A preferred implementation of the angular reflectivity of the first (outer) surface of the waveguide having an anti-reflective coating is shown in FIG. 12. Angular range 166 represents the angle 100. In this range, the transmittance of the waveguide should be maximal. Light rays from scenery that are outside the range 100 originate from front 168 or back 120 (limited by facet reflectance, facet or observer face obscuration). The angular range of these rays is shown as 170 in FIG. 10B. According to one aspect of the present invention, the anti-reflection coating on the waveguide is modified to have high reflectivity at 170 and high transmittance at 166. (High reflectance at high angles is a common property of AR coatings designed for perpendicular light incidence.) This greatly reduces forward and backward scenery illuminations entering the waveguide 10 entering at high angle and reflecting by internal facets onto the eye.

Thus, according to one implementation of this aspect of an embodiment of the present invention, first (outer) major external surface 11A is coated with a multi-layer coating configured to provide anti-reflective properties for visible light incident at angles of incidence smaller than 40 degrees and to provide high reflectivity for at least a first polarization of visible light incident at angles of incidence greater than 70 degrees. Depending on the particular requirements for the directly viewed field of regard of the observer through the LOE and the likely directions from which problematic ambient illumination may be incident, it may be preferably to provide anti-reflective properties for angles up to 50 degrees and/or high reflectivity for angles above about 60 degrees, but the closer these limits become, the more demanding the coating requirements become, to the extent that they may become unrealistic or unreasonably complex to implement. In this context, "anti-reflective properties" preferably refers to reflectivity which is less than 5%, and most preferably less than 3%. "High reflectivity" in this context refers to reflectivity in excess of 70%, and preferably in excess of 80%, more preferably at least 90%, and in some particularly preferred cases, at least 95%.

When considering the ranges of angles from which external illumination may be incident, it may be difficult to achieve the desired exclusion of high angle of incidence (small grazing angle) for the entire FOV and for the entire visible spectrum. Therefore, in a particularly preferred implementation of the present invention, this reflectivity enhancement is optimized for only the S polarization of high angle incident illumination. An alternative solution is provided for reducing visibility of ghosts from P polarization illumination from an external source, as described below.

Specifically, referring to refracted ray 22A of FIG. 2A, according to the above approach, the residual light which is refracted at, and transmitted through, the front major surface of the light guide from incident ray 20 is likely to be substantially p-polarized due to the coating of the outer surface. Some of the ghost reflection ray paths involve a subsequent reflection of ray 22A at the second (rear) major external surface 11B of the substrate, such as to generate ghost ray 23A. However, due to refraction at the interface away from the major surface normal, any part of this light that is transmitted through the rear major surface 11B will continue on a steep downward path 20A substantially parallel to the direction of propagation of the ambient light 20 entering the front major surface of the LOE, and will not disturb the eye of the wearer of the near-eye display. It is therefore proposed to coat the back surface of the LOE with an anti-reflective coating in order to increase the transmission of the high incident angle rays. Achieving effective anti-reflective coating for P polarization at all angles is more feasible. As a result, this second aspect of the present invention complements the first aspect in that a large proportion of the incident external ghost illumination with S polarization can be excluded by external reflection at the front surface 11A while a large proportion of the P polarization ghost illumination can be transmitted at the rear surface 11B. The result is that the overall ghost illumination following the path illustrated in FIG. 2 is greatly reduced compared to existing LOEs.

Thus, according to this aspect of the present invention, second major external surface 11B is advantageously coated with a multi-layer coating configured to provide anti-reflective properties for visible light incident at angles of incidence smaller than 40 degrees and to provide low reflectivity for a second polarization of visible light perpendicular to the first polarization incident at angles of incidence between 70 degrees and at least about 85 degrees (preferably close to 90 degrees).

Referring again to FIG. 2, regarding the alternative light ray path which may generate a ghost 32A, a ghost may be formed by residual ambient light which penetrates into the LOE and then reflects off a partially reflective facet of the light guide (e.g., from ray 22A to ray 24A or from ray 26A to ray 28A) in a relatively restricted range of angles which is typically different from the range of angles (and polarization orientation) in which the display signal propagates. It is therefore proposed to modify the design of the partially reflecting surface coating to substantially diminish the reflectivity within one or both of those particular ranges of angles. Specifically, facet coatings which suppress reflection for high-angle rays will tend to minimize the amount of light which enters the guided mode (i.e., the reflection from ray 22A to 24A) and thus suppress the intensity of ghost 32A.

Micro-Louver Film Variant

As an alternative, or additional, implementation of the previous aspect of the present invention, rejection of high-angle incident light can be achieved using a louver film deployed in front of the outer surface of the LOE and configured to block light incident from high angles while providing high transmission of light from an external scene over a desired field of view. Micro-louver films are known, and are commonly used as "privacy films" for limiting visibility of computer displays to a desired range of viewing angles. Examples of such films are commercially available from the 3M° Company under the description Advanced Light Control Film (ALCF).

Figure 13:
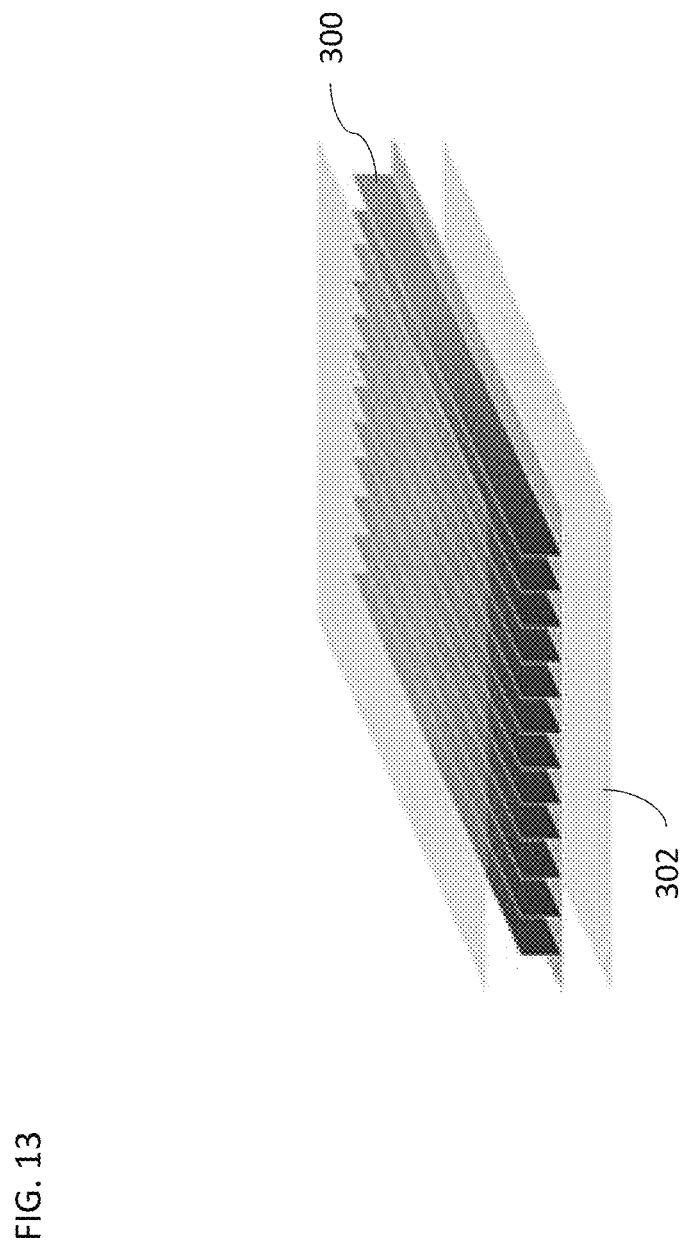
FIG. 13 is a schematic representation of a micro-louver film for use in an implementation of a near-eye display according to a further aspect of an embodiment of the present invention.

The structure of such films is illustrated schematically in FIG. 13, where an inner layer of the film contains an array of opaque (or highly attenuating) micro-louvers 300 supported in a transparent substrate 302 which define a geometrical limit to the angle at which incident light can pass through the film. Commercially available privacy films typically include a one-dimensional array of micro-louvers, i.e., where all of the louvers extend in the same direction. In this case, the film is preferably deployed relative to the LOE so that the louvers extend horizontally, thereby blocking high-angle external light sources coming from above. Alternatively, a two-dimensional array micro-louver structure may be used, having micro-louvers extending in two perpendicular directions (typically in two separate layers of the film structure, superimposed one on the other) to provide exclusion of high-angle external light sources from all sides.

In order to avoid impacting the optical properties of the LOE for internal reflection from the major surfaces, it is typically preferable to avoid applying light control film directly to the LOE surface. Optionally, a suitable structure may be provided to ensure that an air gap is maintained adjacent to the LOE, and the light control film is supported on a separate optical element (lens or the like) slightly spaced from the LOE. Alternatively, a buffer or "isolation" layer may be provided which has a sufficiently low effective refractive index to preserve the optical properties of the LOE. Examples for suitable materials for such layers are commercially available, and include aerogels and various other materials used for similar purposes. According to a further alternative implementation, an angularly-selective reflective coating, typically implemented using a multi-layer dielectric coating, may be provided to simulate TIR for the relevant range of angles for the image propagating within the LOE while allowing high transmission at small angles. This option also allows direct optical attachment of the micro-louver film to the coated surface of the LOE without compromising the optical properties of the LOE. Parenthetically, all of the above-mentioned options for applying supporting a micro-louver film relative to an LOE without impacting its optical properties are equally applicable where mention is made herein of a polarizing filter associated with one or both surfaces of the LOE.

In a particularly preferred implementation, the micro-louver layer 300 is associated with first major external surface 11A of the LOE 10, and blocks light incident at an angle of incidence greater than 70 degrees F.rom at least one direction from entering the LOE. Where a micro-louver layer 300 having a one-dimensional array of micro-louvers is used, the micro-louver layer is preferably deployed with the extensional direction substantially horizontal. Alternatively, a micro-louver layer having two arrays of micro-louvers having substantially perpendicular extensional directions may be used.

Polarization Filtering

Figure 9B:
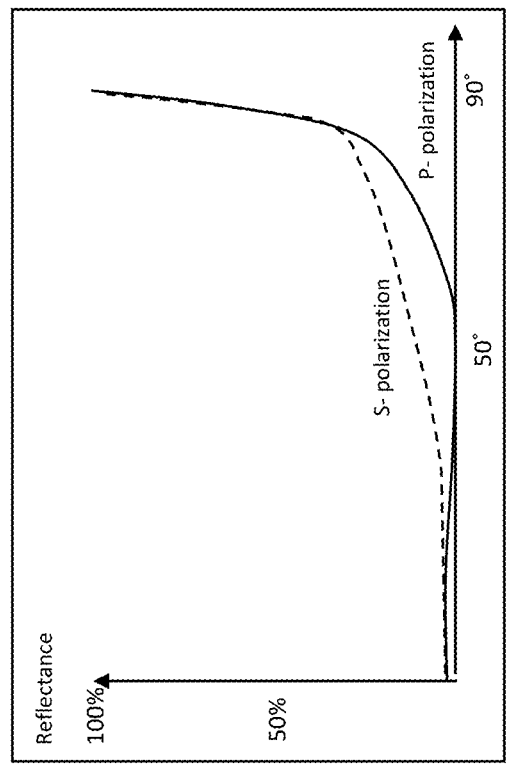
FIG. 9B is a corresponding graph of reflectance as a function of angle of incidence for unmodified Fresnel reflection.
Figure 9A:
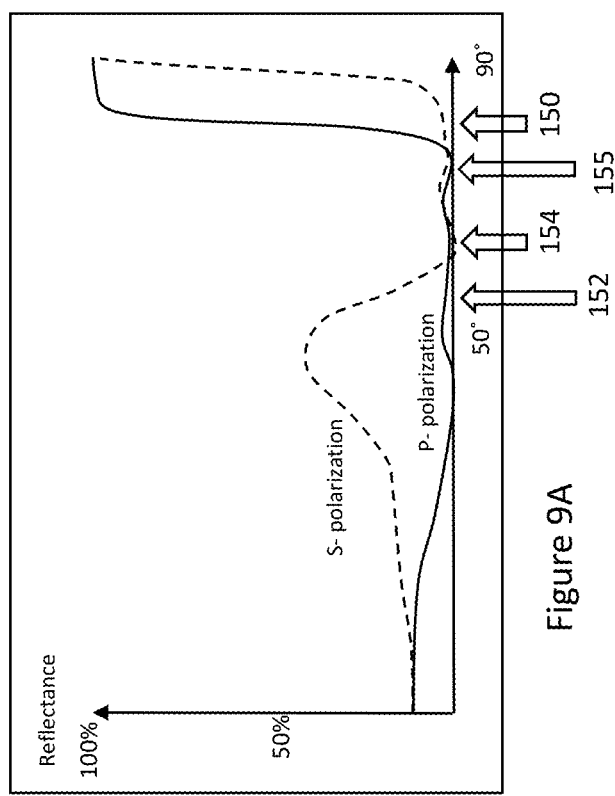
FIG. 9A is a graph illustrating reflectance as a function of angle of incidence for coatings of an exemplary partially-reflective surfaces (facets) according to an implementation of the present invention.

The design of coatings on the facets has a significant impact on reflection filtering. FIG. 9A shows the angular reflectivity of a typical coating used on facets 12A and 40A. In most cases, the reflectivity is polarization dependent (or "polarization sensitive") as shown, as is also inherent to the basic Fresnel reflection properties (FIG. 9B).

Arrow 150 shows the angle corresponding to the reflection 26A(B) to 28A(B). For this coating and at this incident angle, P-polarization reflects more than S-polarization. Arrow 154 shows the angular reflection of 22A(B) to 24A(B) having low reflectivity and no polarization selectivity. In an alternative implementation employed for the facets of certain LOEs, 155 and 152 represent the angles of the reflection having a clearly dominant S-polarization. According to an aspect of an embodiment of the present invention, particular choices of facet tilt angle and/or coating profile can be used to harness polarization-dependent properties to suppress real world reflections, as will now be described.

Figure 10A:
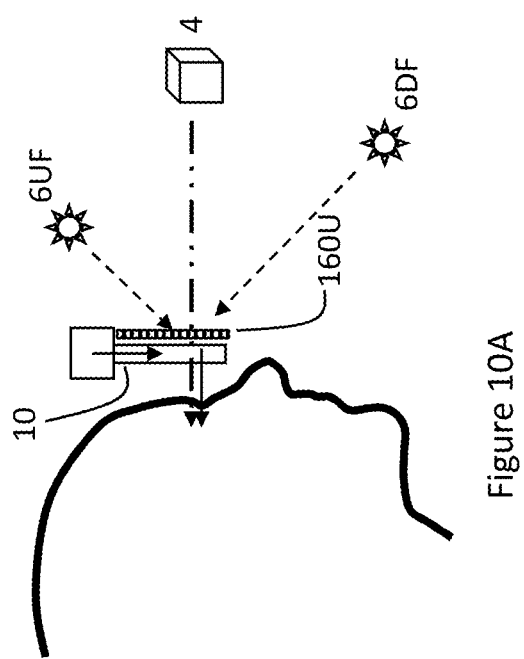
FIG. 10A is a schematic side view similar to FIG. 1A illustrating a variant implementation employing an external polarizing filter.
Figure 10B:
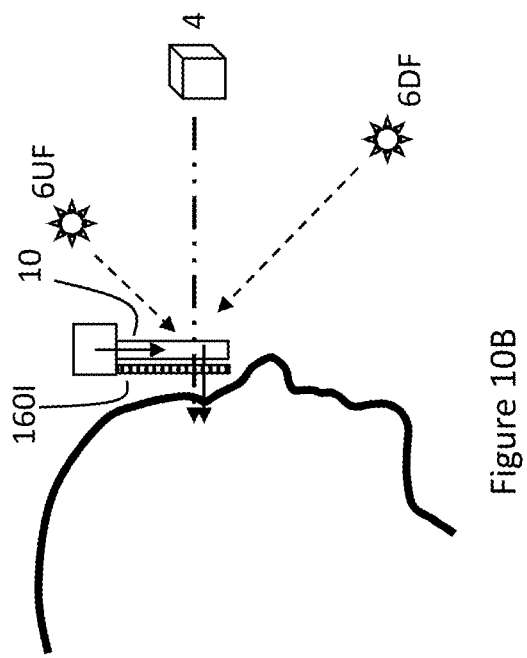
FIG. 10B is a view similar to FIG. 10A illustrating a variant implementation employing an internal polarizing filter.

Since the reflections (such as 6UF or 6DF) can be controlled to have predefined dominant polarization (for example, by suitable anti-reflective coatings as described above, or through properties of the facets themselves), ghost reflection attenuation is advantageously achieved by using a polarization filter or "polarizer" 160U in front of the waveguide as shown in FIG. 10A. Any suitable type of polarizer may be used, most preferably a structural (or "Cartesian") polarizer, and typically, an absorbent polarizer is used. This polarizer will attenuate the un-polarized light from the scenery 4 by 50% (which, in many cases, may anyway be required or desirable) but will attenuate the polarized upper-frontal reflection 6UF or the lower-frontal reflection 6DF by much more. The orientation of the polarizer should be set preferably relative to the orientation of the facets reflecting (perpendicular or horizontal to the facets depending on S or P blocking).

In some cases, the LOE and the coupling-out arrangement define at least one high-incident-angle polarization-dependent optical path incident on one of the first and second major external surfaces at an angle of incidence greater than 60 degrees and exiting the LOE towards the eye of the observer, where the polarization-dependent optical path has a favored orientation of polarization. A polarization filter is then advantageously deployed to prevent external light advancing along the polarization-dependent optical path with the favored orientation of polarization from reaching the eye of the observer. In the above example of FIG. 10A, polarization filter 160U is deployed externally to filter light entering the first (outer) major external surface 11A.

One implementation of an embodiment of the present invention is a waveguide having facet coating that is designed to generate reflections of a real-world ghost image having polarization that is perpendicular to the polarization of the coupled-out projected image. In this case, the polarizer can be placed on the inner side facing the observer as shown by 160I in FIGS. 10B and 10C, i.e., where the polarization filter is deployed to filter light exiting the second major external surface towards the eye of the observer. This configuration can block reflection projecting onto the eye that originated also from back of the waveguide (6SB for example) and passes twice through the polarizer as apparent in FIG. 10C. However, this configuration should be used only if the virtual image projected by projector 2 illuminates the eye with minimal attenuation or distortion by this polarizer. In other words, where the image illumination coupled out of the LOE towards the eye of the observer is substantially polarized with an image polarization, and polarization filter 160I is deployed to block light having a polarization perpendicular to the image polarization.

In each case where a polarizer is used, it will be noted that the orientation of the polarizer is dictated by the facet structure, orientated so that the polarization of real-world ghost illumination which would potentially be reflected by the facets is attenuated while the polarization which is not significantly reflected by at least one of the sets of facets at its particular incident angle according to the ghost the ray path is allowed to pass. This results in a polarizer orientation which is in many cases angularly offset (for example, by at least 20 degrees, or at least 30 degrees, and in certain cases, by between 60 degrees and 120 degrees) from the normal polarized sunglasses deployment which transmits P-polarization and rejects S-polarization from horizontal surfaces.

FIG. 10D show Implementation of side-polarizer 160S on the side of the system. This way the polarizer acts much the same as polarizer 160U to block the polarization that side-reflections from the waveguide (6SB). Preferably, the side polarizer is implemented with the front polarizer 160U or 160I so the intensity visibility of the scenery is the same from front or peripheral (side).

If 160I is used in conjunction with 160S (as shown in FIG. 10D) then the orientation of 160S is preferably perpendicular to 160I (i.e., crossed polarizing axes, such as one vertical and one horizontal), resulting in complete blocking of all side reflections while maintaining peripheral visibility.

Figure 10E:
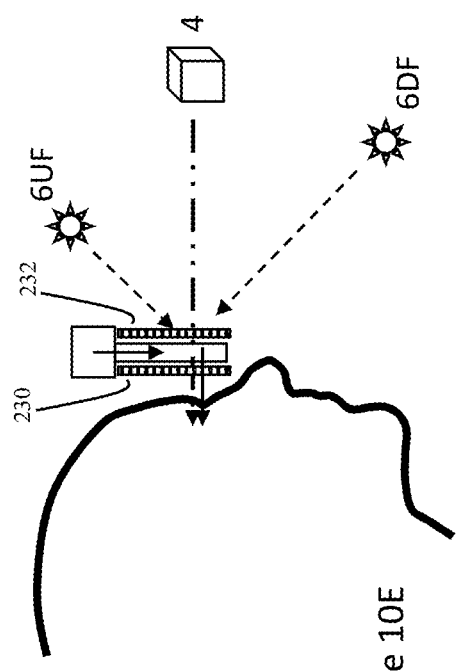
FIG. 10E is a view similar to FIG. 10A illustrating a variant implementation employing both an internal polarizing filter and an external polarizing filter.

In some waveguide and facet architectures the virtual injected image impinges on the eye with a linear polarization. In such cases, a polarizer can be used closer to the eye (as shown in 10B), with the effect that some of the ghost reflections are filtered. However, in addition to this, some of scenery reflections also reflect at same polarization after polarization rotation in the waveguide. Since this polarization rotation does not happen to the direct scenery light rays 4, then introducing a second polarizer 232 (FIG. 10E) having the same orientation as 230, will not have any additional effect on the direct rays 4 but will introduce additional attenuation to reflections 6UF and 6DF.

Variant Implementations for LOE with Two Sets of Facets

Certain implementations of an LOE according to the present invention employ two distinct non-parallel sets of partially-reflective surfaces to achieve optical aperture expansion in two dimensions within the LOE. Many of the above features for eliminating or attenuating (collectively, "suppressing") unwanted reflections of real world illumination (ghosts) are equally applicable to a 2D expansion LOE. Various additional considerations in some of these applications are addressed below with reference to FIGS. 14A-16C.

Figure 14C:
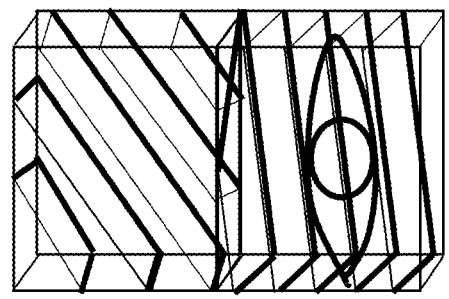
FIGS. 14A-14C are schematic representations of eye position relative to facet positions in various implementations of a near-eye display using a light-guide optical element which includes two distinct sets of partially-reflective surfaces at different orientations.
Figure 14A:
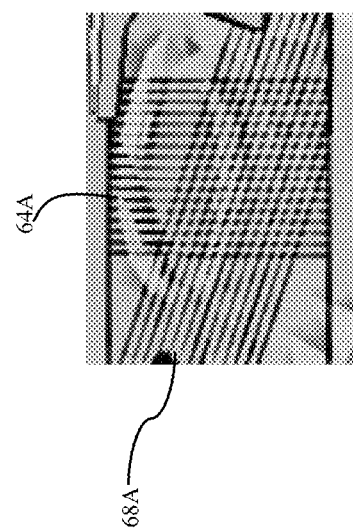
Figure 14B:
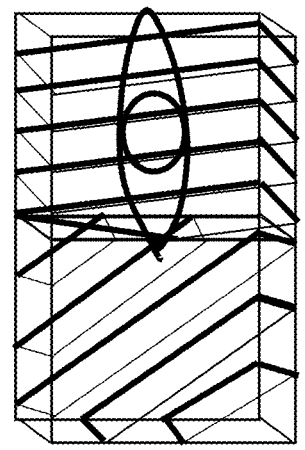

In FIG. 14A, facets 64A are located in front of the eye to reflect the guided image onto the eye. Facets 68A are used for optical aperture expansion by reflection from one guided image direction to a different guided image direction within the light guide, and do not couple to the eye. This makes it feasible in some cases to position these facets away from eye relevant field so as to eliminate the visibility of their direct reflections. FIG. 14A shows an arrangement in which facets 68A are located lower than the eye center. Further overlap reduction is possible through a non-overlapping architecture as shown in FIGS. 14B and 14C where the eye looks through a section with only with one type of facets.

Figure 15A:
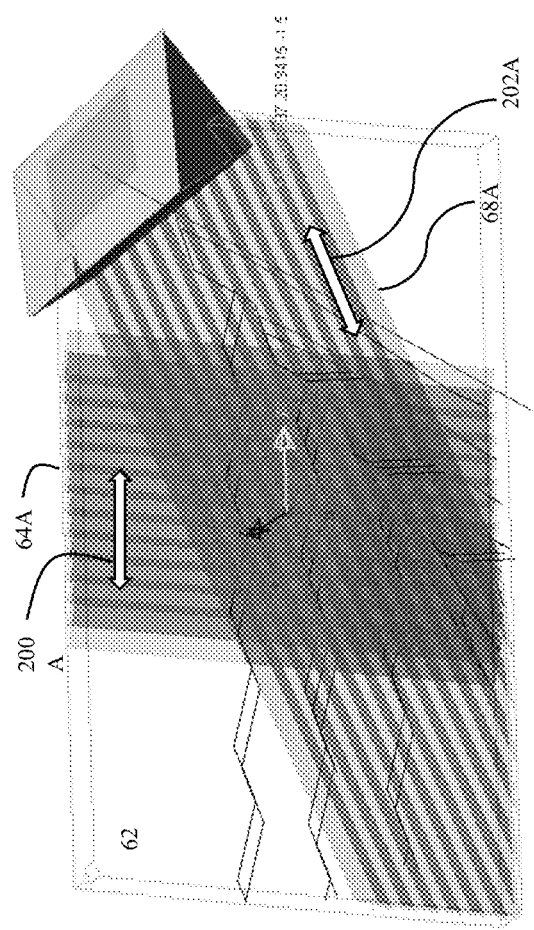
FIG. 15A is a schematic illustration of a further example of a near-eye display using a light-guide optical element which includes two distinct sets of partially-reflective surfaces at different orientations, where primary reflected polarization vectors for both sets of facets are similarly aligned.
Figure 15B:
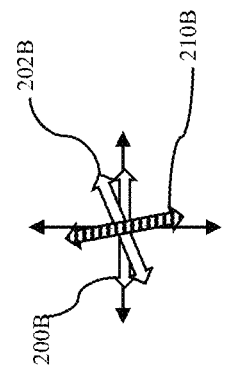
FIG. 15B is a schematic representation of an orientation of polarizing filter suitable for use with the light-guide optical element of FIG. 15A.

FIG. 15A shows two overlapping sets of facets. The polarization architecture presented in FIGS. 10A-10E can be applied on both facet sets simultaneously. The polarizer efficiency is improved by manipulating the reflections from both polarizations to be close to parallel by setting one to be P and one S polarized as shown in FIG. 15A by 200A and 202A. FIG. 15B shows overlay of the polarization orientations (200B and 202B) and preferred polarization orientation to block the combined polarization.

Alternatively the polarizer can be set perpendicular (or parallel) to the facets generating the dominant reflections.

FIG. 16A shows a waveguide having two sets of facets, where the slanted set of facets 220 is used for vertical aperture expansion of the injected image and the vertical set of facets 222 is used for horizontal expansion. Facets 220 can be tilted relative to external facets of the waveguide. In this case, the single facet reflection will typically be from behind as described in FIG. 6. However, if the facets 220 are perpendicular (or close to perpendicular) to the external faces of the light guide, then single reflection may occur from a direction in front of the light guide, as illustrated by the arrow of FIG. 16B.

FIG. 16C shows reflectivity of a typical facet coating (the reflectivity is as described by 3C having approximately or accurately perpendicular facets) having typical reflection angle 224 and angle 226 of frontal single reflection (FIG. 16B). It is apparent that the back reflections will tend to be at angles 224 closer to perpendicular, where the dielectric coating will have low differentiation between the polarizations, while frontal reflection angles 226 will have high differentiation. Therefore, according to an aspect of the present invention, a polarizer 228 is placed in front of the waveguide that filters out the polarization that would otherwise give rise to a significant single frontal reflection.

Some coatings have inherent polarization selectivity also at perpendicular angles such as wire-grid or birefringent dielectric (as by 3M). In this case, a side polarizer (160S in FIG. 10D) can advantageously be used to achieve effective reflection attenuation.

The polarizer 228 can be designed to have different orientations in front of 220 and in front of 222 since the different orientations of the facets will generate reflections having different polarizations. Optionally, a non-linear polarizer which gradually transitions between the two desired polarization orientations may be used in order to avoid a sharp boundary.

Reflections can originate from multiple reflections by more than one set of facets. For example in FIG. 12A a reflection can have some degree of linear polarization after reflection by facets 68A and change to arbitrary polarization after reflection by facets 64A. In this case the specific polarization of the reflection should be calculated and non-linear polarizer used with the waveguide. This can include a wave-plate or other birefringent material with the linear polarizer.

The optical properties of the reflection that impinges onto the eye can change across the waveguide. Therefore the methodologies describe above, can be used non-uniformly across the waveguide to achieve reflection suppression all across the field-of-view of the observer. This can include (not limited to):

Variable polarizer

Variable wave-plate

Variable coating of parallel and not parallel facets

Variable coating of the external faces of the waveguide for varying transmittance and polarization In all the above description, top-down configurations are equivalent to side, configuration and vertical facets are equivalent to horizontal. In other words, the arrangements are generally interchangeable; rotating the system by 90 degrees is possible. This includes the baffles, coatings and polarization.

It will be appreciated that the above descriptions are intended only to serve as examples, and that many other embodiments are possible within the scope of the present invention as defined in the appended claims.

What is claimed is:

1. A near-eye display for projecting an image to an eye of an observer, the near-eye display comprising:
   (a) a light-guide optical element (LOE) having first and second major external surfaces that are planar and mutually parallel, said first and second major external surfaces being separated by a thickness of said LOE, said LOE having edges;
   (b) a support arrangement configured for supporting said LOE relative to the head of the observer with said second major external surface in facing relation to the eye of the observer;
   (c) an image projector for projecting illumination corresponding to the image, said image projector being optically coupled to said LOE so as to introduce the illumination into said LOE so as to propagate within said LOE by internal reflection at said first and second major external surfaces;
   (d) a coupling-out arrangement deployed for coupling the illumination out of said LOE towards the eye of the observer; and
   (e) a light-blocking baffle extending along a majority of one of said edges of said LOE and projecting by a plurality of times said thickness of said LOE from a plane of said second major external surface so as to block incident radiation from a range of glancing angles from reaching at least part of said second major external surface, said baffle projecting in a direction towards the eye of the observer forming an acute angle with said second major external surface, wherein said coupling-out arrangement comprises a plurality of mutually-parallel, partially-reflective surfaces deployed within said LOE at an oblique angle to said first major external surface, and wherein said partially-reflective surfaces have a direction of extension parallel to said second major external surface, and wherein said baffle extends along a majority of one of said edges substantially parallel to said direction of extension of said partially-reflective surfaces.

2. The near-eye display of claim 1, wherein said light-blocking baffle projects in a direction towards a center of an eyeball of the observer.

3. The near-eye display of, claim 1, wherein deployment of said baffle and of said partially-reflective surfaces precludes ray paths from reaching the eye of the observer after entering one of said first and second major external surfaces and undergoing a single reflection from one of said partially-reflective surfaces.

4. The near-eye display of claim 1, wherein said light-blocking baffle is mechanically supported by attachment to said LOE.

5. The near-eye display of claim 1, wherein said light-blocking baffle is mechanically supported by attachment to said support arrangement.

6. A near-eye display for projecting an image to an eye of an observer, the near-eye display comprising:
   (a) a light-guide optical element (LOE) having first and second major external surfaces that are planar and mutually parallel, said first and second major external surfaces being separated by a thickness of said LOE, said LOE having edges;
   (b) a support arrangement configured for supporting said LOE relative to the head of the observer with said second major external surface in facing relation to the eye of the observer;
   (c) an image projector for projecting illumination corresponding to the image, said image projector being optically coupled to said LOE so as to introduce the illumination into said LOE so as to propagate within said LOE by internal reflection at said first and second major external surfaces;
   (d) a coupling-out arrangement deployed for coupling the illumination out of said LOE towards the eye of the observer; and
   (e) a light-blocking baffle extending along a majority of one of said edges of said LOE and projecting by a plurality of times said thickness of said LOE from a plane of said second major external surface so as to block incident radiation from a range of glancing angles from reaching at least part of said second major external surface, said baffle projecting in a direction towards the eye of the observer forming an acute angle with said second major external surface, wherein said coupling-out arrangement comprises a plurality of mutually-parallel, partially-reflective surfaces deployed within said LOE at an oblique angle to said first major external surface, and wherein said partially-reflective surfaces have a direction of extension parallel to said second major external surface, and wherein said baffle extends along one of said edges so as to span a majority of a dimension of said LOE parallel to said direction of extension of said partially-reflective surfaces.

\* \* \* \* \*